(12) United States Patent
Unger et al.

(10) Patent No.: US 8,250,604 B2
(45) Date of Patent: Aug. 21, 2012

(54) NEAR REAL-TIME MULTIPLE THUMBNAIL GUIDE WITH SINGLE TUNER

(75) Inventors: Robert Allan Unger, El Cajon, CA (US); James Amendolagine, San Marcos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 749 days.

(21) Appl. No.: 12/012,766

(22) Filed: Feb. 5, 2008

(65) Prior Publication Data
US 2009/0199241 A1    Aug. 6, 2009

(51) Int. Cl.
G06F 3/00 (2006.01)
G06F 13/00 (2006.01)
H04N 5/455 (2006.01)

(52) U.S. Cl. .............................. 725/44; 725/41; 715/838

(58) Field of Classification Search .................... None
See application file for complete search history.

(56) References Cited

U.S. PATENT DOCUMENTS

| | | | |
|---|---|---|---|
| 6,419,137 B1 | 7/2002 | Marshall et al. | |
| 6,445,306 B1* | 9/2002 | Trovato et al. | 340/825.24 |
| 6,934,964 B1 | 8/2005 | Schaffer et al. | |
| 7,743,343 B2* | 6/2010 | Fong et al. | 715/841 |
| 2002/0171686 A1 | 11/2002 | Kamen et al. | |
| 2003/0016304 A1* | 1/2003 | Norsworthy et al. | 348/565 |
| 2003/0018972 A1 | 1/2003 | Arora | |
| 2003/0221192 A1* | 11/2003 | Rappaport et al. | 725/41 |
| 2005/0138564 A1* | 6/2005 | Fogg | 715/745 |
| 2005/0273838 A1* | 12/2005 | Witheiler | 725/126 |
| 2006/0031880 A1* | 2/2006 | Stark et al. | 725/45 |
| 2006/0039481 A1* | 2/2006 | Shen et al. | 375/240.25 |
| 2006/0256782 A1* | 11/2006 | Shimizu | 370/360 |
| 2007/0050813 A1 | 3/2007 | Lee | |

FOREIGN PATENT DOCUMENTS

WO    WO 9607270 A1    3/1996

OTHER PUBLICATIONS

"InterVideo Home Theater™ 2, Platinum," InterVideo, Corel website, © 2008.
"Time Warner Cable Mobile TV", Time Warner Cable website, © 2008.
"Win/TV-Celebrity Digital Video Board," Win/TV Celebrity, Hauppauge Computer Works, Inc., © 1995.
Robotfunk Flowmotion 2.0 User Manual, © 2000-2003.

* cited by examiner

*Primary Examiner* — Scott Beliveau
*Assistant Examiner* — Patrick A Ryan
(74) *Attorney, Agent, or Firm* — Miller Patent Services; Jerry A. Miller (57) ABSTRACT

A method of presenting a video electronic program guide (EPG), consistent with certain embodiments involves establishing a sorting of television channels, with a selected channel having a highest sorting priority, and other channels being arranged in pairs in a hierarchy below the selected channel; displaying a plurality of windows representing a plurality of the channels in a cross media bar menu arrangement, with the principal focus channel being represented at a window appearing at an intersection of horizontal and vertical bars in the cross media bar menu arrangement and the pairs of channels arranged on either side of the selected channel in the cross media bar menu arrangement; and retrieving sample clips of the channels in focus section of the sort order, and presenting the clips as repeating clips in their respective windows. This abstract is not to be considered limiting, since other embodiments may deviate from the features described in this abstract.

18 Claims, 9 Drawing Sheets

NEAR REAL-TIME MULTIPLE THUMBNAIL GUIDE WITH SINGLE TUNER

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

It is commonplace for electronic program guides (EPGs) used to navigate a multitude of television channels to provide a listing including text descriptions of titles of programs. Sometimes text descriptions may not sufficient for a viewer to make an informed selection of what to watch on TV. Hence, "channel surfing" is a popular means for finding a program.

When two or more tuners are available, a clip or trailer can be provided by using the secondary tuner to "surf" while a primary tuner continues to provide a primary program. But, generally when only one tuner is available, only one show can be viewed at a time. If the user is "surfing" for the next show to watch, he can only see one active channel at a time. A common solution is to have a single live playback in the corner of the screen based upon the highlighted entry in the on-screen text display.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments; with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The term "processor", "controller", "CPU", "Computer" and the like as used herein encompasses both hard programmed, special purpose, general purpose and programmable devices and may encompass a plurality of such devices or a single device in either a distributed or centralized configuration without limitation.

In certain embodiments, the present invention provides a method to provide near real-time thumbnail clips of real time content for navigation and selection. Since sometimes text descriptions are suitably informative to make an informed selection of what to watch on TV. The equivalent of a movie trailer is desired. With only one tuner, only one show can be viewed at a time. If the user is "surfing" for the next show to watch, he can only see one active channel at a time.

In certain embodiments, this invention captures short clips from multiple channels on "both sides" of the highlighted channel as well as the highlighted channel. As used herein, the "highlighted channel is considered the channel of primary focus, whereas other channels appearing on the video menu system may be considered to be of secondary or peripheral focus. A single tuner can scan a group of channels and cache thumb-nail video clips to play in "repeat" mode. This way the "surfer" can browse the channel list viewing "cached" thumb-nail video clips of the recently captured channels. These clips can play alongside the program's text description, as a clip based Cross Media Bar (XMB) display, or other formats as desired for the user interface.

In embodiments consistent with the present invention a "cache" of short clips is captured from multiple channels. Any or all of the cached clips can be displayed simultaneously. The channel navigation system can pre-fetch channels to be cached based on location of the neighboring channels in the sort order. Any suitable sorting algorithm can be used to calculate the proximity of channels based on current sort mode: genre, title, station ID, Network, favorite list, auto favorite (list could keep track of the amount of time a given program/genre is viewed, and sort based on past use), etc.

Applications using XMB provide a good example as shown in the descriptions below. At any point in time there will be a finite number of channels of interest. Snapshot clips of these channels are captured in a rotating sequence with the primary thumbnail alternating with the other six. Each snapshot will cover a short span of time (e.g. up to about 30 seconds or so). An example sequence might be C for the center channel, C+1, C, C−1, C, C+2, C, C−2, C, C+3, C, C−3, C repeating until the primary is rotated to another selection or the current primary focus is selected to be watched.

While embodiments consistent with this invention make use of a single tuner to obtain the thumbnails, TVs with an internet connection can probably get thumbnails online as well. In the case of the Internet, the caching system can be more elaborate: Instead of caching a live video stream using the tuner, the TV can send a request for meta-data to a host on the Internet (e.g., using Sony's Bravia Internet Video Link (BIVL) protocol). Meta-data can include a "preview" video-clip highlighting the channels current show. Since this would be a canned video clip, it can potentially show-off the focus program better than a cached clip of the live video channel. Other meta-data can also be passed including text descriptions, related shows etc.

Figure 1:
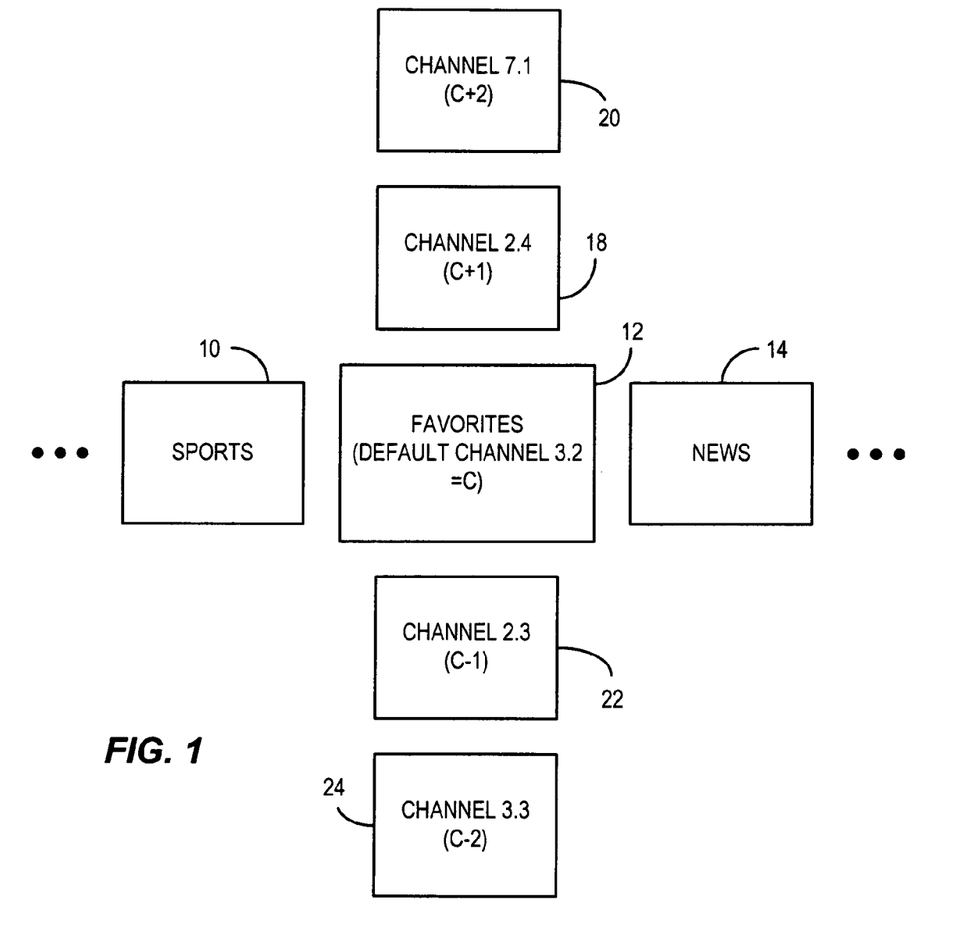
FIG. 1 is an exemplary depiction of a cross media bar menu consistent with certain embodiments of the present invention.

Turning now to FIG. 1, this figure illustrates an exemplary cross-media bar (XMB) menu system similar in configuration to that currently in use with Sony Electronics Inc.'s and Sony Corporation's Bravia® series television sets. In such an arrangement, horizontal icons may be used to represent sources of content or collections of television channels (e.g., sports, news, favorites, movies, etc.). When the user navigates to a desired source or collection, a vertical bar appears providing a listing of members of the collection or television channels. In this example, three of the series of horizontal channel selections are shown as sports 10, favorites 12, and news 14. In this example, assume that the user selects favorites 12 by navigation using navigation controls (after invoking the menu system). It is also assumed that only one tuner is available in the present application, but embodiments may also utilize multiple tuners.

In certain embodiments, upon invoking the menu and selecting favorites, normally an array of television program titles will appear vertically. Alternatively, a set of icons representing networks or the like may be presented. However, the user may wish to see clips of programming content when this selection is made. In any case, it is assumed that an order has been established either manually or by a sorting algorithm forming a part of the Electronic Program Guide (EPG) or menu system that defines the order in which the programs appear in the text, graphical or (in the case of embodiments consistent with the present invention) video depictions. This ordering, if automated can use any suitable algorithm including fixed placement, order of frequency, time of viewing, proximity in the transport stream, or manual selection by the viewer. In any event, the program guide or menu system establishes a sorting of television channels, with a selected channel having a highest sorting priority, and other channels being arranged in pairs in a hierarchy below the selected channel In the example shown, a total of five channels may be presented as menu selections for ease of explanation, but more or fewer may be presented without departing from embodiments consistent with the present invention. In this example, the default channel that appears in the center is referred to as channel C. The channel may be default by virtue of any desired mechanism (e.g., last viewed channel on the favorites list or default as designated by the viewer). Above and below default channel C are other channels in this category, which may be numerically arranged, arranged according to proximity in the transport stream (TS) or manually arranged by the user or as determined by some other algorithm. It is illustrative to note that a random sequence of high definition HD virtual channel numbers have been affixed to these channels which are designated C+1 (18), C+2 (20), C−1 (22) and C−2 (24). The channel numbers of 7.1, 2.4, 3.2, 2.3 and 3.3 have been designated purely as an indication that they may not be in numerical order.

In accord with certain embodiments consistent with the present invention, when the menu is invoked and, for example "favorites" is selected, the initial view will display either icons or virtual channel listings in text, and may further display other information about the content.

Figure 2:
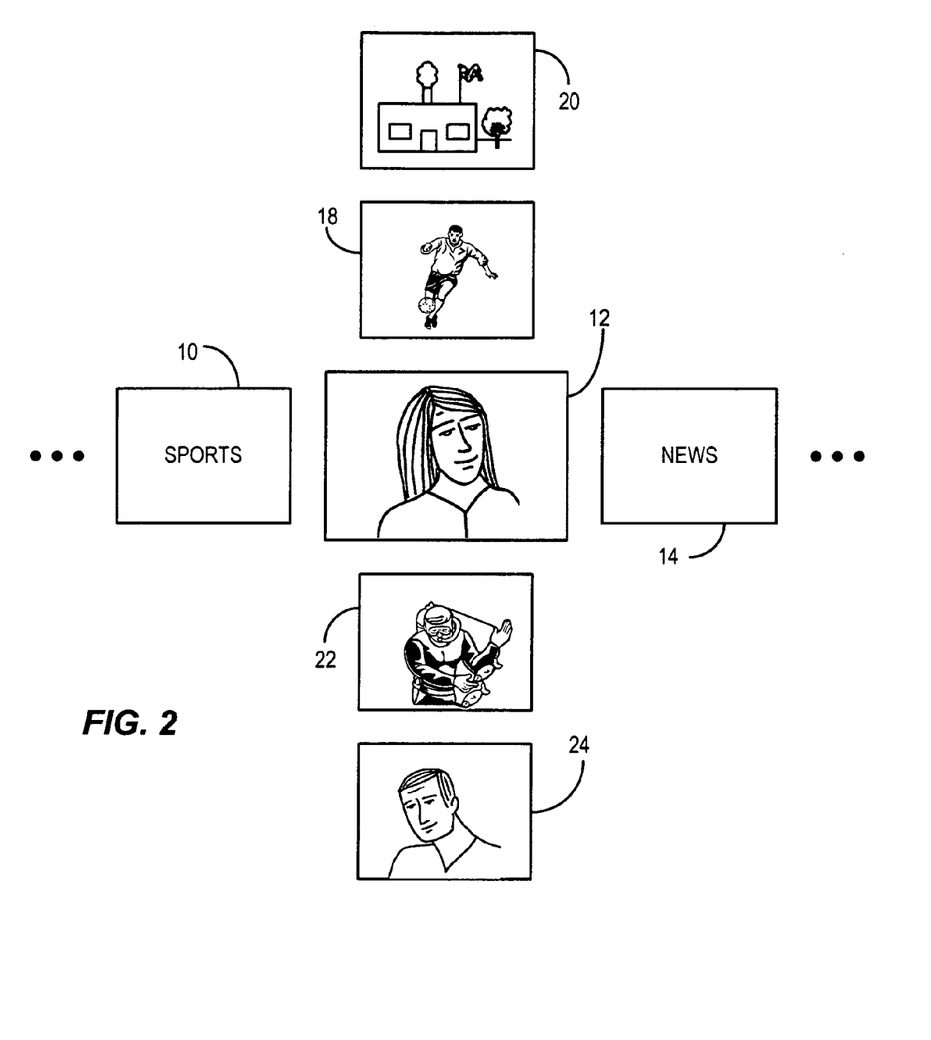
FIG. 2 is another exemplary depiction of a cross media bar menu having video icons consistent with certain embodiments of the present invention.

Referring now to FIG. 2, it is desirable in accord with embodiments consistent with the present invention to begin populating the windows 12, 18, 20, 22 and 24 with video clips or trailers to provide a more dynamic environment from which the viewer can select content. Hence, it is desirable to retrieve clips of content with which to fill the windows 12, 18, 20, 22 and 24. Since only one tuner may be available, this can be achieved by first tuning and receiving channel C, which by virtue of default status should be of high likelihood of interest. This clip is shown in window 12 and retrieved for a suitable period of time N (e.g., 10 to 20 seconds). After this point, the clip is repeated in this window 12 while clips for the other windows are sequentially retrieved. Since the user might logically select highly preferred channels at window locations C−1 and C+1 (windows 18 and 22), it follows that these channels might be retrieved sequentially next for a period of time M, which might be a shorter period of time (e.g., 5 to 15 seconds). Finally, the channels C−2 and C+2 can be retrieved sequentially to place repeating clips in windows 20 and 24. These clips might also be shorter (e.g., 5 to 15 or 5 to 10 seconds). Initially, it may be desirable to populate the various windows with text or icons from the system information available until video clips can be captured, and then overlay the image with text and/or logos. Or, alternatively, the splice point between videos could be occupied with a network logo, program title, other text from the meta-data, etc.

Hence, preferably, the center channel C will display the longest repeating clip while the channels farther from the center might display the same or shorter length clips or progressively shorter clips as the window gets farther away from center. Also recall that for convenience, the present example shows only five such windows, but seven or nine, or more or less may also be present. In such case, the general procedure is the same. It is also noted that for digital content, a single receiver may be able to effectively retrieve more than one channel simultaneously if they are a part of the same transport stream, by simply filtering more than one set of content for caching based on the packet identifiers for the channels occupying the same transport stream. In such case, the actual proximity of the window to the center position would play a secondary role in favor of more rapid population of the windows.

In one preferred implementation, the center channel window would provide a clip of longest duration, the windows closest to center would be somewhat shorter in duration and the duration of the clips farther from the center would be of decreasing duration. This permits more rapid population of the windows and places emphasis on the windows closest to center.

FIG. 2 depicts the fully populated windows with moving video playing in each window. In certain embodiments, several features can be added to enhance the quality of the channel selection experience. In one enhancement, once all windows are populated, the process repeats so that a more recent clip continually repopulates the various windows. In another embodiment, commercial detection can be used to avoid showing repeated clips of commercial spots rather than television programming. Several processes will be described later and this enhancement can be added in the manner depicted.

In the event two tuners are available, one tuner can continuously show the real time broadcast of channel C in window 12 while the second tuner retrieves the clips used to populate windows 18, 20, 22 and 24. Moreover, if trailers are available from another source available to the receiver (e.g., set top box) such as the Internet, these trailers can be retrieved to populate the various windows instead of or as a supplement to caching clips from live broadcast.

Figure 3:
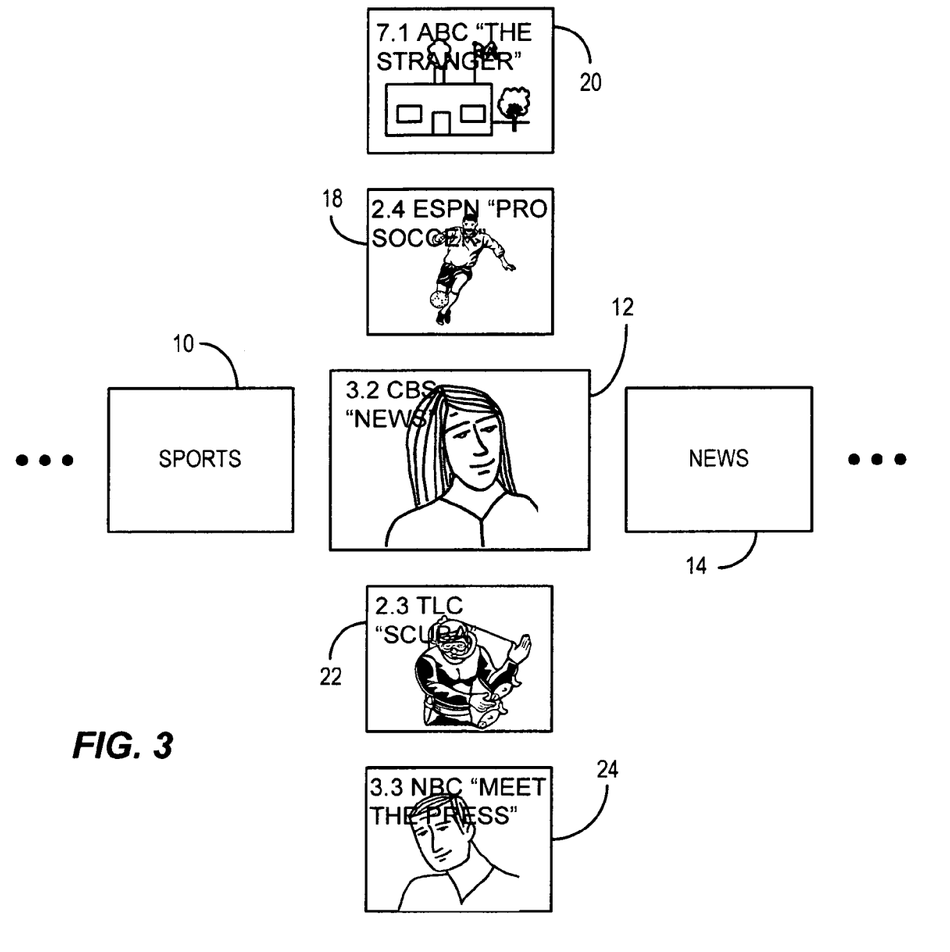
FIG. 3 is another exemplary depiction of a cross media bar menu having video icons and text overlay consistent with certain embodiments of the present invention.

FIG. 3 depicts the EPG as shown in FIG. 2 supplemented by overlay of channel and network information. Any variety of information can be presented in this manner as an overlay including program name, virtual channel, network, network logo, description, etc.

Figure 4:
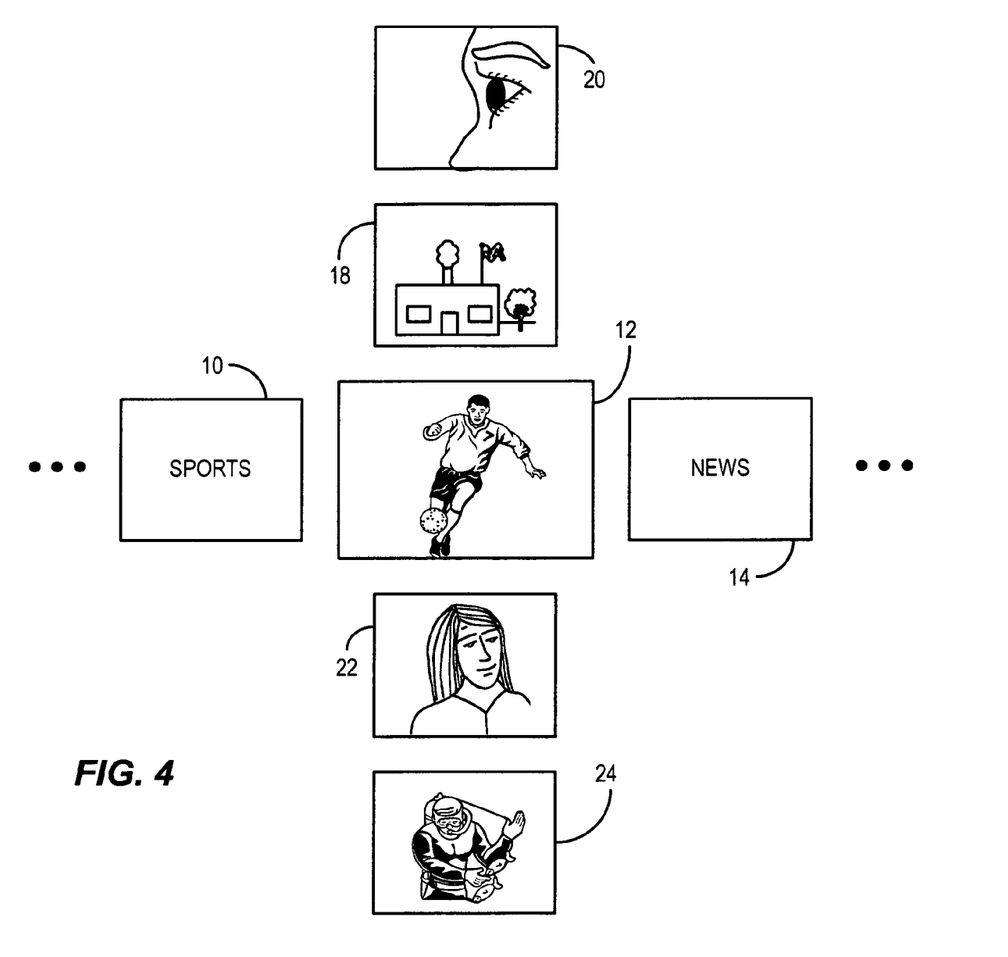
FIG. 4 is another exemplary depiction of a cross media bar menu having video icons after channel scrolling consistent with certain embodiments of the present invention.

Referring now to FIG. 4, the EPG (absent the text or icon overlay for ease of viewing in these diagrams) is depicted after the user utilizes the remote controller or other control mechanism to scroll down the channels by one channel. In this case, clips continue playing for those channels that have been captured, while a new clip is cached for the new channel in the window (or windows) that are revealed. The clips already playing may be truncated (e.g., the clip from channel C moves to C−1 and may be reduced in length according to the established time for positions adjacent the center). Similarly, at the next opportunity, the length of the clips moving into positions closer to or at the center are updated to increase their length. Moreover, clips from channels not yet exposed can be pre-fetched for immediate use when the user scrolls to a new center channel. Many variations will be apparent upon consideration of the present teachings.

Figure 5:
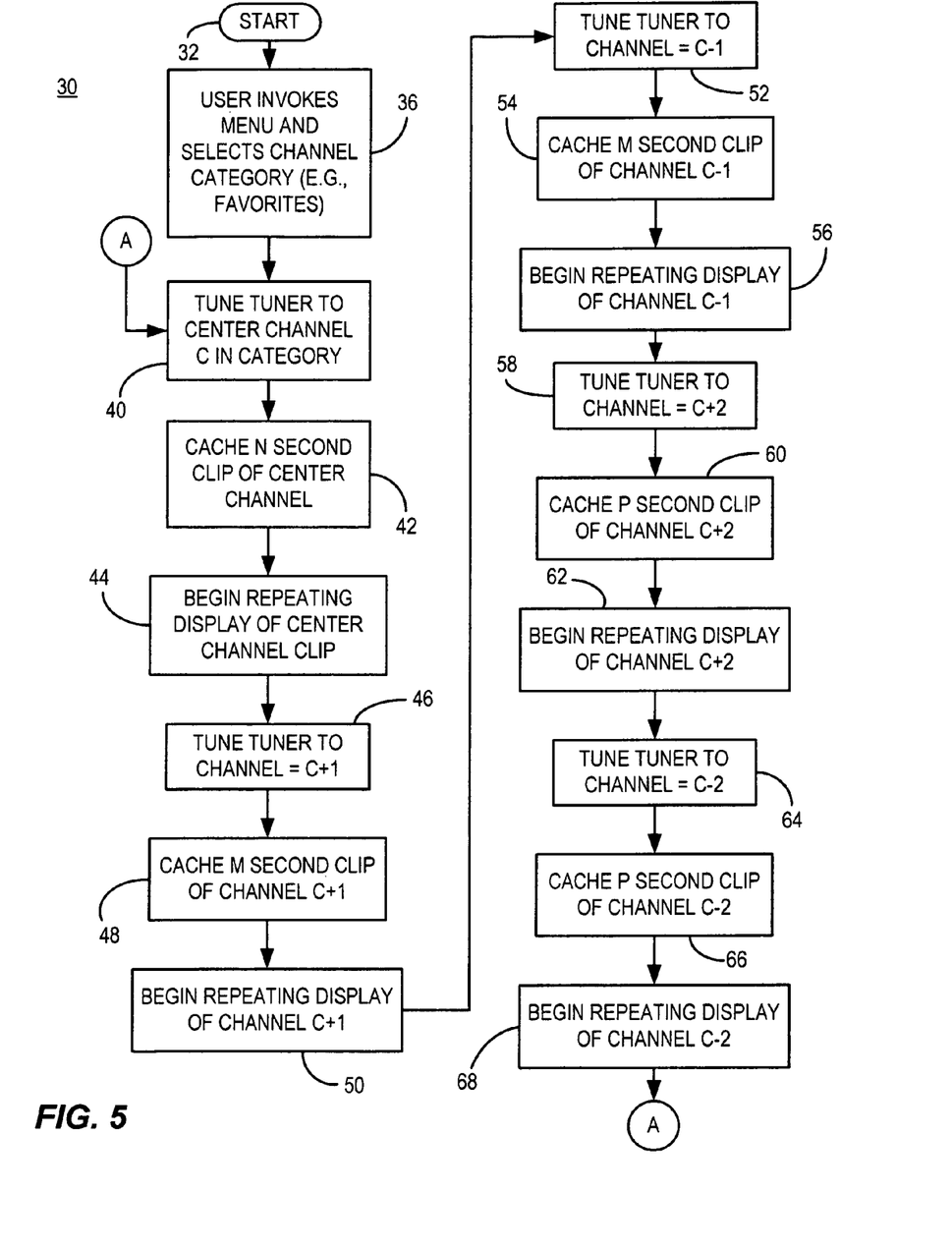
FIG. 5 is a flow chart depicting an example operation of populating the menu bar with video clips in a manner consistent with certain embodiments of the present invention.

One elementary example of the basic process 30 is depicted in FIG. 5 for populating the menu with video clips starting at 32. In this embodiment, channel windows are populated using the order C, C+1, C−1, C+2, C−2, but other orderings can be easily adapted (e.g., C, C−1, C+1, C−2, C+2; or C, C+1, C, C−1, C, C+2, C, C−2; etc.). The user invokes the menu system and selects a category (e.g., favorites, sports, news, weather, local channels, etc.) at 36. At 40 the receiver is directed to begin reception of channel C and displays the content in the window 12 simultaneously with caching a segment of the content at 42 so that the user can immediately begin taking advantage of the preview of the content. When N seconds of content have been displayed, those N seconds are cached and begin repeating at 44. The tuner then moves on to tune channel C+1 at 46 while preferably simultaneously showing the real time content at window 18 while caching M seconds of the content at 48. Once M seconds are cached, the M second clip may begin repeated play at 50. A similar process is repeated to tune to channel C−1 at 52 while displaying the content in window 22, caching M seconds of channel C−1 and repeating play of the clip at 52, 54 and 56 respectively. N, M and P are referred to as the clip times and can vary in a number of ways as will be discussed.

A similar process is carried out to capture and repeatedly display clips of length P at 58, 60 and 62 for channel C+2, and at 64, 66 and 68 for channel C−2. The process can be similarly incremented for additional channels if more than five are to be shown in the EPG. It is noted that the tuning time plus time for capture of the cache should be optimized for a given system since acquisition of a new channel can take approximately 1 second, up to five seconds can be consumed in this process plus the actual time for download of the sample clip. Hence, clip length should be balanced with user friendliness of the interface. Several example times for display of the samples, without intent of limitation, for a five channel interface include 20-15-7, 15-10-5, or 20-10-10 or 15-5-5 seconds starting at the channel C and moving outward. Thus, P can be shorter or equal to M, or all channel time clips can be weighted equally to produce 10-10-10, etc. It is also noted that the virtual channel information or broadcaster logo may be displayed as an overlay for reference in these windows 12, 18, 20, 22 and 24 along with the video clips.

Figure 6:
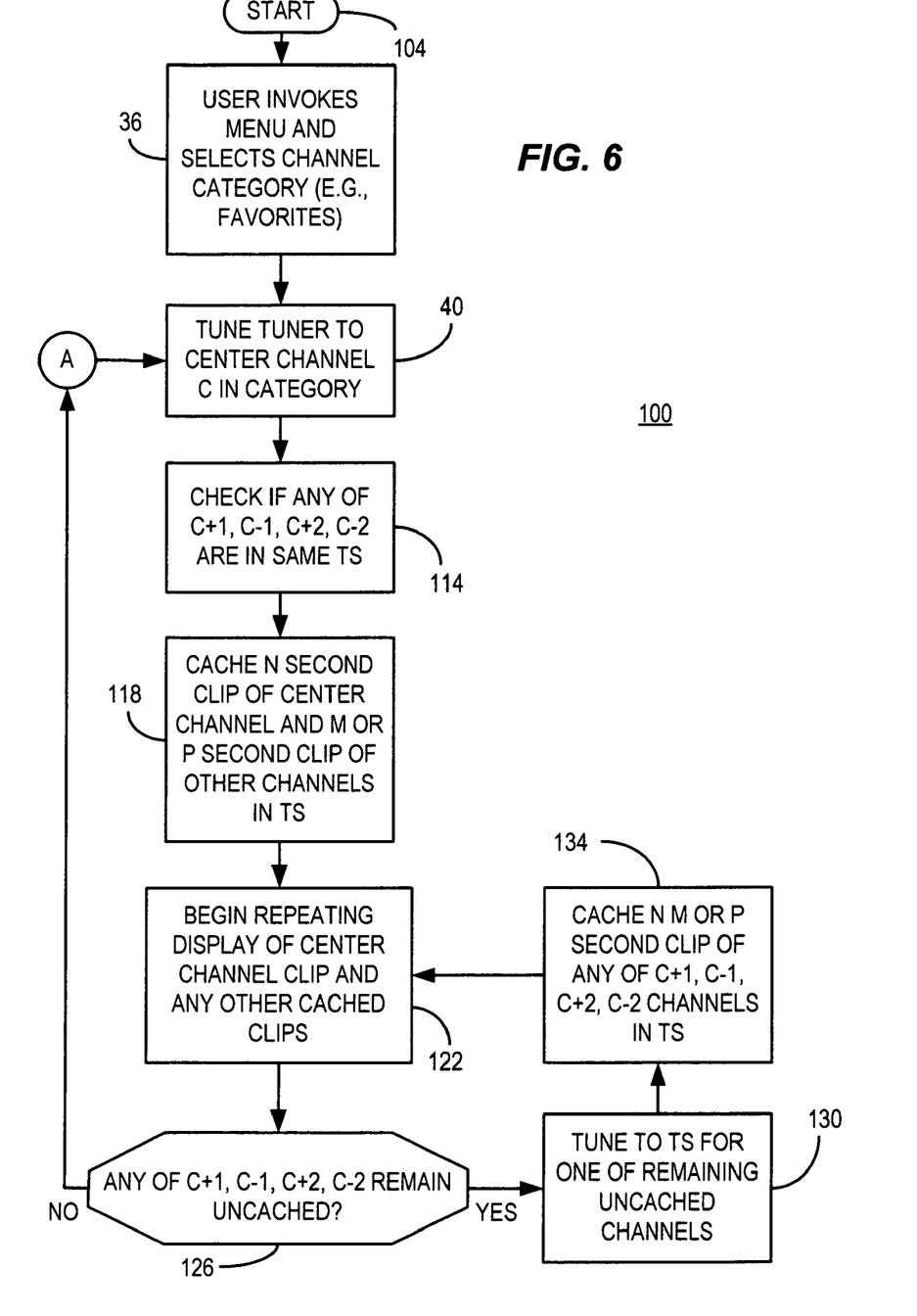
FIG. 6 is a flow chart depicting another example operation of populating the menu bar with video clips in a manner consistent with certain embodiments of the present invention.

The process speed can be potentially enhanced by use of a process 100 depicted in FIG. 6 starting at 104. At 36, the user invokes the menu and selects a channel category as described previously. The tuner then tunes to the center channel in the category as before at 40. However, it is noted that if any of channels C+1 (18), C+2 (20), C−1 (22) and C−2 (24) are carried on the same transport stream at 114 from the source, since several channels are often accommodated by a single transport stream, it is possible to speed up the process. In this case, the caching and populating of the window of several programs can be carried out simultaneously at 118. Those cached programs can then be repeated in their respective windows for the respective time designated for the window position at 122. When all of the windows have been cached at 126, the process can return to 40 where updating of the windows can begin. If any windows remain to be populated at 126, the tuner tunes to an un-cached channel at 130 and caches any channels in that transport stream at 134 and control returns to 122. In this manner, the windows can potentially be populated with clips more rapidly. In another embodiment, further speed enhancement can be achieved by populating each of the windows with a short clip and live video can be presented in the C channel window until a channel is changed. Many other variations are possible and will occur to those skilled in the art upon consideration of the present teachings.

Figure 7:
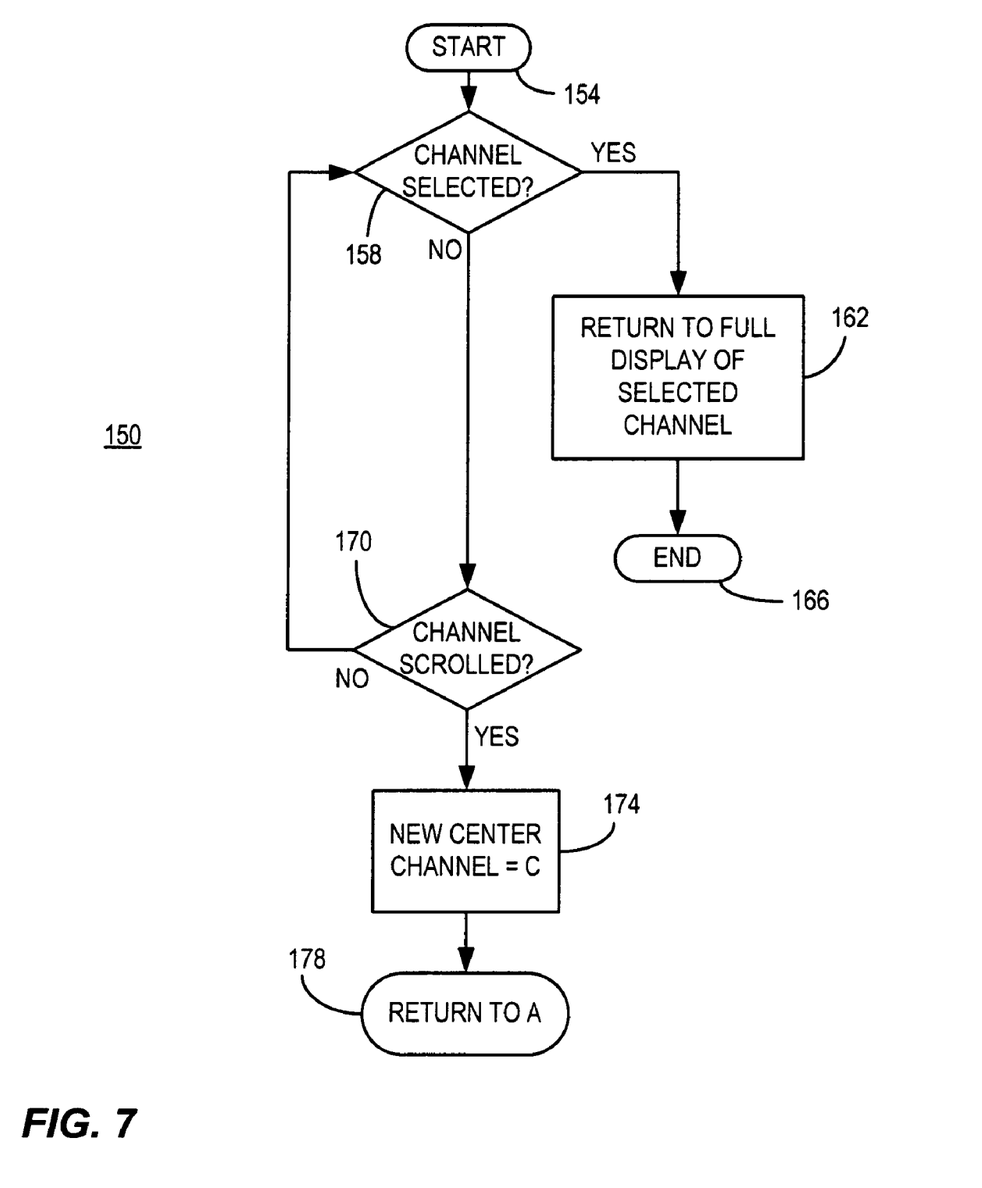
FIG. 7 is a flow chart depicting a channel scroll decision in a manner consistent with certain embodiments of the present invention.

When the user scrolls to a new channel or selects a channel for viewing, the operations 150 of FIG. 7 can be carried out starting at 154. If a channel is selected at 158, the system exits the menu display and begins to display the selected channel on the full screen or other normal viewing mode at 162 and the menu process ends at 166 until re-invoked by the user. If a channel is scrolled up or down at 170, the position of the images within the windows (and possibly the relative size of the image—with C being largest) are shifted to the next position. The tuner then sets a new channel C at 174. The process can then return to 40 in process 30 in one embodiment, or to 40 in process 100 in another embodiment at 178. Other variations are also possible.

Figure 8:
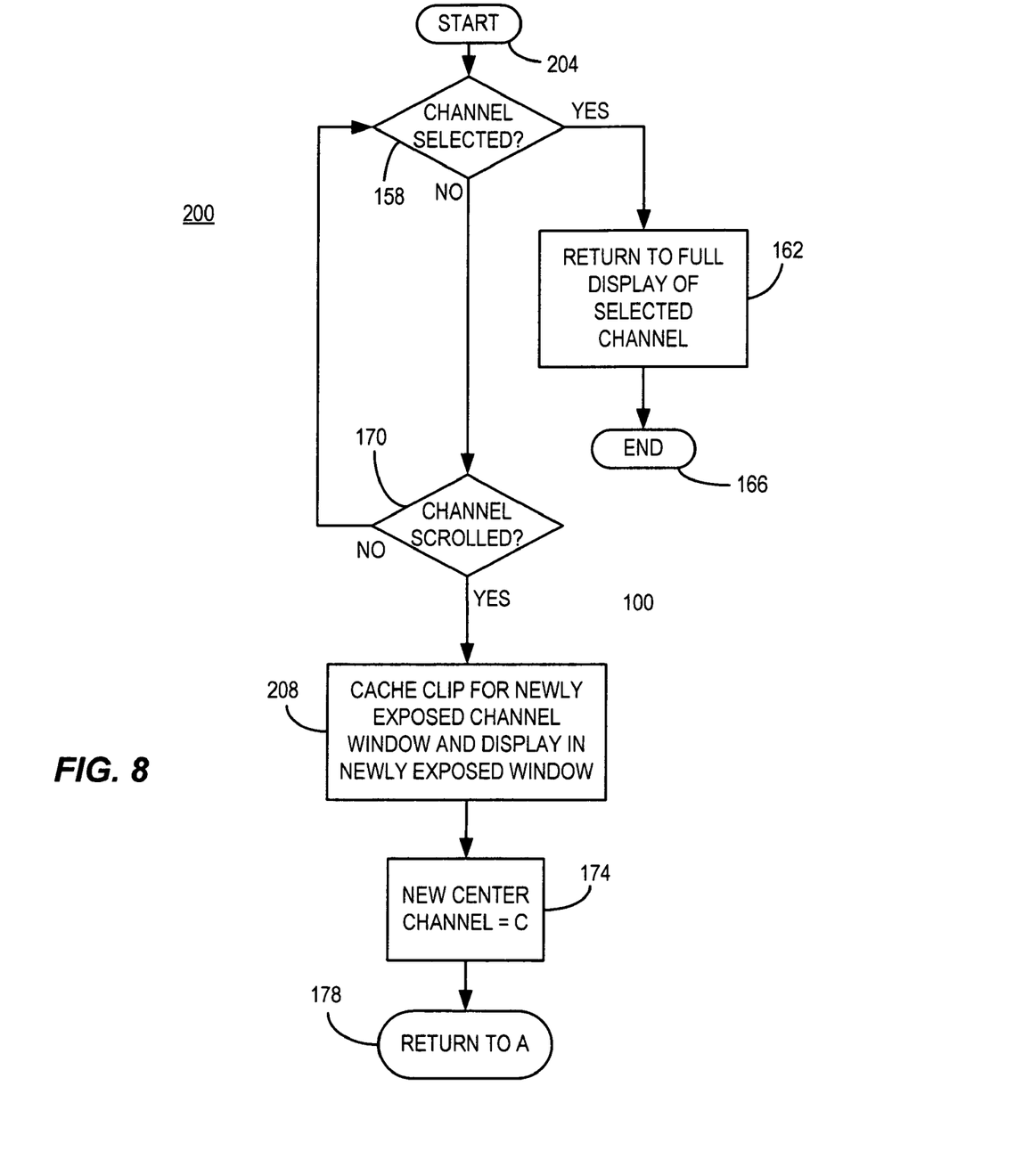
FIG. 8 is another flow chart depicting a channel scroll operation in a manner consistent with certain embodiments of the present invention.

Another variant is depicted as process 200 starting at 204 in FIG. 8 which is similar process 150 except that the tuning, capturing and repeat display process (e.g., as in 64, 66 and 68 of process 30) are carried out at 208 for the newly exposed channel resulting from the scrolling operation prior to resetting and tuning to the channel now occupying the C position. This rapidly populates the vacant channel position before proceeding back to a process similar to that of process 30 or 100.

Figure 9:
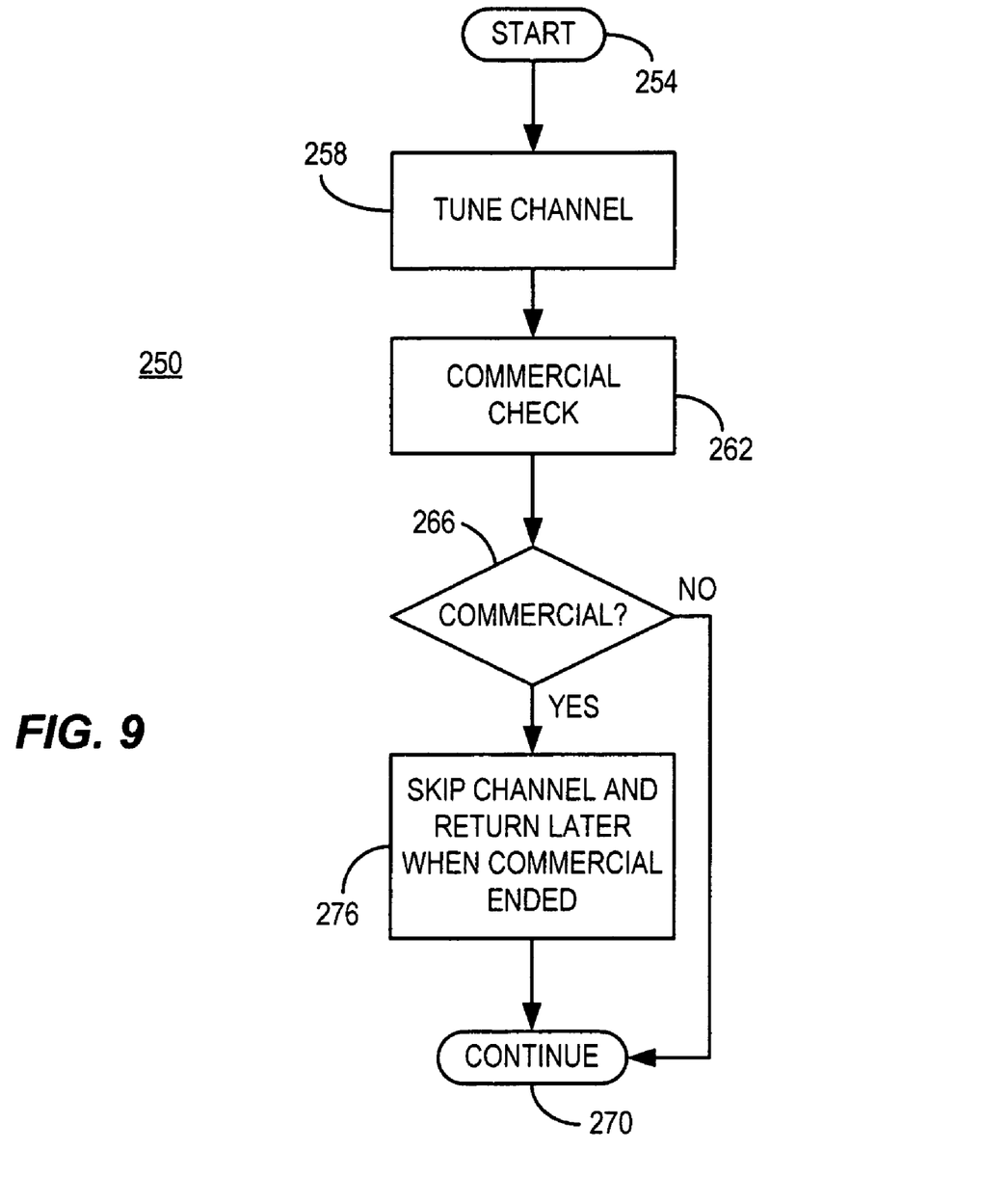
FIG. 9 is a flow chart depicting a commercial check decision consistent with certain embodiments of the present invention.

A variant in any of the above process is depicted as process 250 of FIG. 9 starting at 250. In this variant, each tuning process at 258 is followed by a check to see if the channel is currently playing a commercial spot at 262. If not, the process proceeds as normal at 270. If a commercial spot is currently playing, the channel is skipped at 276 and the process (e.g., similar to 30 or 100) then proceeds to the next channel and returns at a later time to capture the clip for the channel after the commercial spot is completed.

Many variations are possible without departing from the scope of embodiments consistent with the present invention. By way of example, although the XMB interface was depicted with the video windows arranged vertically, they could equally well be arranged horizontally.

Thus, a method of presenting a video electronic program guide (EPG), consistent with certain embodiments involves establishing a sorting of television channels, with a selected channel having a highest sorting priority, and other channels being arranged in pairs in a hierarchy below the selected channel; displaying a plurality of windows representing a plurality of the channels in a cross media bar menu arrangement, with the principal focus channel being represented at a window appearing at an intersection of horizontal and vertical bars in the cross media bar menu arrangement and the pairs of channels arranged on either side of the selected channel in the cross media bar menu arrangement; and retrieving sample clips of the channels in focus section of the sort order, and presenting the clips as repeating clips in their respective windows.

In certain embodiments, each sample clip has a clip time, and wherein the clip time of the principal focus channel's clip is longer than the clip time of other clips in the sort. In certain embodiments, the clip time of each clip decreases with increasing distance from the principal focus clip. In certain embodiments, each sample clip has an equal clip time. In certain embodiments, the retrieving and presenting are repeated at a prioritized periodic rate. In certain embodiments, if any two or more channels are received over the same transport stream, the order of retrieval of the two or more channels is modified from strictly distance order, and the clips that are received over the same transport stream are retrieved substantially simultaneously In certain embodiments, the process further involves checking each channel to determine if its content currently contains a commercial spot, and if so, skipping the retrieval and presenting of any channel currently containing a commercial spot until such time as the commercial spot has ended. In certain embodiments, the window size for the principal focus channel is larger than the window size for others of the channels. In certain embodiments, the method further involves overlaying the video clips with identifying information relating to at least one of the network, program or the channel being displayed. In certain embodiments, the method further involves receiving a user command for selection of a channel and responsive thereto removing display of the cross media bar menu, and displaying the selected channel in a normal viewing mode. In certain embodiments, the method can be carried out using a single television receiver. A computer readable storage medium can store instructions which, when executed on one or more programmed processors, carry out any of the above processes.

In another embodiment, a method of presenting a video electronic program guide (EPG) involves establishing a sorting of television channels, with a selected channel having a highest sorting priority, and other channels being arranged in pairs in a hierarchy below the selected channel; displaying a plurality of windows representing a plurality of the channels in a cross media bar menu arrangement, with the principal focus channel being represented at a window appearing at an intersection of horizontal and vertical bars in the cross media bar menu arrangement and the pairs of channels arranged on either side of the selected channel in the cross media bar menu arrangement; and retrieving sample clips of the channels in focus section of the sort order, and presenting the clips as repeating clips in their respective windows, wherein each sample clip has a clip time, and wherein the clip time of the principal focus channel's clip is longer than the clip time of other clips in the sort, and wherein the clip time of each clip decreases with increasing distance from the principal focus clip.

In certain embodiments, repeating the retrieving and presenting can be carried out at a prioritized periodic rate. In certain embodiments, if any two or more channels are received over the same transport stream, the order of retrieval of the two or more channels is modified from strictly distance order, and the clips that are received over the same transport stream are retrieved substantially simultaneously. In certain embodiments, the method further involves checking each channel to determine if its content currently contains a commercial spot, and if so, skipping the retrieval and presenting of any channel currently containing a commercial spot until such time as the commercial spot has ended. In certain embodiments, the window size for the principal focus channel is larger than the window size for others of the channels. In certain embodiments, the process further involves overlaying the video clips with identifying information relating to at least one of the network, program or the channel being displayed. In certain embodiments, the method further involves receiving a user command for selection of a channel and responsive thereto removing display of the cross media bar menu, and displaying the selected channel in a normal viewing mode. A computer readable storage medium can store instructions which, when executed on one or more programmed processors, carry out any of the above processes.

Those skilled in the art will recognize, upon consideration of the above teachings, that certain of the above exemplary embodiments can be based upon use of one or more programmed processors, computers or other programmable devices. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, may be implemented using one or more programmed processors executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of presenting a video electronic program guide (EPG), comprising in combination:
    establishing a sorting priority of a plurality of television channels that reside on a plurality of separate transport streams, with a principal focus channel comprising a selected channel having a highest sorting priority, and other channels being arranged in pairs of equivalent sorting priority in a hierarchy relative to the selected channel from highest sorting priority to lowest sorting priority of the other channel pairs;
    where the sorting priority is determined by a selected category of channels;
    displaying a plurality of windows representing a plurality of the channels in a cross media bar menu arrangement, with the principal focus channel being represented at a window appearing at an intersection of horizontal and vertical bars in the cross media bar menu arrangement and the pairs of channels arranged on either side of the selected channel in the cross media bar menu arrangement, with windows representing the pairs of channels situated opposite each other relative to the intersection of the horizontal and vertical bars and with the windows representing the pairs of channels having lower sorting priority being equivalently situated progressively further from the principal focus channel window relative to the respective equivalent sorting priority of the pair of channels;
    sequentially retrieving sample clips of the plurality of television channels that reside on the plurality of separate transport streams in the selected category in order of the sorting priority starting at the highest sorting priority and proceeding in order to the lowest sorting priority by tuning to, in order of the sorting priority, each transport stream carrying each channel, except that where a lower or equal sorting priority channel in the selected category of channels is carried in the same transport stream as a channel that is currently being retrieved, then the lower or equal sorting priority channel is retrieved along with the channel that is currently being retrieved by selecting packet identifiers of the lower or equal sorting priority channel; and
    presenting the sample clips as repeating clips in their respective windows.

2. The method according to claim 1 wherein each sample clip has a clip time, and wherein the clip time of the sample clip of the principal focus channel is longer than the clip time of other sample clips in the sort.

3. The method according to claim 1, wherein each sample clip has an equal clip time.

4. The method according to claim 1, further comprising repeating the retrieving and presenting at a prioritized periodic rate.

5. The method according to claim 1, further comprising checking each channel to determine if its content currently contains a commercial spot, and if so, skipping the retrieval and presenting of any channel currently containing a commercial spot until such time as the commercial spot has ended.

6. The method according to claim 1, wherein a window size for the principal focus channel is larger than a window size for others of the channels.

7. The method according to claim 1, further comprising overlaying the sample clips with identifying information relating to at least one of a network, a program or a channel being displayed.

8. The method according to claim 1, further comprising receiving a user command for selection of a channel and responsive thereto removing display of the cross media bar menu arrangement, and displaying the selected channel in a normal viewing mode.

9. The method according to claim 1, carried out using a single television receiver.

10. A non-transitory computer readable storage medium storing instructions which, when executed on one or more programmed processors, carry out a process according to claim 1.

11. A method of presenting a video electronic program guide (EPG), comprising in combination:
    establishing a sorting priority of a plurality of television channels that reside on a plurality of separate transport streams, with a principal focus channel comprising a selected channel having a highest sorting priority, and other channels being arranged in pairs of equivalent sorting priority in a hierarchy relative to the selected channel from highest sorting priority to lowest sorting priority of the other channel pairs;
    where the sorting priority is determined by a selected category of channels;
    displaying a plurality of windows representing a plurality of the channels in a cross media bar menu arrangement, with the principal focus channel being represented at a window appearing at an intersection of horizontal and vertical bars in the cross media bar menu arrangement and the pairs of channels arranged on either side of the selected channel in the cross media bar menu arrangement, with windows representing the pairs of channels situated opposite each other relative to the intersection of the horizontal and vertical bars and with the windows representing the pairs of channels having lower sorting priority being situated progressively further from the principal focus channel window relative to the respective equivalent sorting priority of the pair of channels;
    sequentially retrieving sample clips of the plurality of television channels that reside on the plurality of separate transport streams in the selected category in order of the sorting priority starting at the highest sorting priority and proceeding in order to the lowest sorting priority by tuning to, in order of the sorting priority, each transport stream carrying each channel, except that where a lower or equal sorting priority channel in the selected category of channels is carried in the same transport stream as a channel that is currently being retrieved, then the lower or equal sorting priority channel is retrieved along with the channel that is currently being retrieved by selecting packet identifiers of the lower or equal sorting priority channel; and presenting the sample clips as repeating clips in their respective windows;

wherein each sample clip has a clip time, and wherein the clip time of the sample clip of the principal focus channel is longer than the clip time of other sample clips in the sort, and wherein the clip time of each sample clip decreases with increasing distance from the sample clip of the principal focus channel.

12. The method according to claim 11, further comprising repeating the retrieving and presenting at a prioritized periodic rate.

13. The method according to claim 11, further comprising checking each channel to determine if its content currently contains a commercial spot, and if so, skipping the retrieval and presenting of any channel currently containing a commercial spot until such time as the commercial spot has ended.

14. The method according to claim 11, wherein a window size for the principal focus channel is larger than a window size for others of the channels.

15. The method according to claim 11, further comprising overlaying the sample clips with identifying information relating to at least one of a network, a program or a channel being displayed.

16. The method according to claim 11, further comprising receiving a user command for selection of a channel and responsive thereto removing display of the cross media bar menu arrangement, and displaying the selected channel in a normal viewing mode.

17. The method according to claim 11, carried out using a single television receiver.

18. A non-transitory computer readable storage medium storing instructions which, when executed on one or more programmed processors, carry out a process according to claim 11.

* * * * *